(12) United States Patent
Daly et al.

(10) Patent No.: US 11,651,010 B2
(45) Date of Patent: *May 16, 2023

(54) FACILITATING ANSWERING QUESTIONS INVOLVING REASONING OVER QUANTITATIVE INFORMATION

(71) Applicant: International Business Machines Corporation, Armonk, NY (US)

(72) Inventors: Elizabeth Daly, Dublin (IE); Charles Arthur Jochim, Dublin (IE); Akihiro Kishimoto, Dublin (IE); Vanessa Lopez Garcia, Dublin (IE); Radu Marinescu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/135,406

(22) Filed: Dec. 28, 2020

(65) Prior Publication Data

US 2021/0117457 A1 Apr. 22, 2021

Related U.S. Application Data

(63) Continuation of application No. 15/875,051, filed on Jan. 19, 2018, now Pat. No. 11,030,226.

(51) Int. Cl.
*G06F 16/332* (2019.01)
*G06F 16/33* (2019.01)
*G06N 20/00* (2019.01)
*G06N 7/01* (2023.01)

(52) U.S. Cl.
CPC ...... *G06F 16/3329* (2019.01); *G06F 16/3344* (2019.01); *G06N 7/01* (2023.01); *G06N 20/00* (2019.01)

(58) Field of Classification Search
CPC . G06F 16/3329; G06F 16/3344; G06N 7/005; G06N 20/00
See application file for complete search history.

(56) References Cited

U.S. PATENT DOCUMENTS 7,373,291 B2   5/2008   Garst
9,430,558 B2   8/2016   Bhat et al.
(Continued)

FOREIGN PATENT DOCUMENTS

CN     104471568 A      3/2015
WO     2015/012764 A1   1/2015

OTHER PUBLICATIONS

Sasikumar, et al., "A Survey of Natural Language Question Answering System," International Journal of Computer Applications (0975-8887), vol. 108—No. 15, Dec. 2014, 5 pages.
(Continued)

*Primary Examiner* — Irete F Ehichioya
*Assistant Examiner* — Ken Hoang
(74) *Attorney, Agent, or Firm* — Amin, Turocy & Watson, LLP

(57) ABSTRACT

Systems, computer-implemented methods and/or computer program products that facilitate answering questions that involve mathematical computations are provided. In one embodiment, a computer-implemented method comprises: transforming, by a system operatively coupled to a processor, a natural language query into a first logical representation and extrinsic knowledge into a second logical representation relevant to the natural language query; merging, by the system, the first logical representation and the second logical representation into a third logical representation; and generating, by the system, answers for the natural language query based on processing of the third logical representation.

20 Claims, 9 Drawing Sheets

(56) References Cited

U.S. PATENT DOCUMENTS

| | | |
|---|---|---|
| 9,460,075 B2 | 10/2016 | Mungi et al. |
| 2011/0196852 A1 | 8/2011 | Srikanth et al. |
| 2013/0226846 A1 | 8/2013 | Li et al. |
| 2015/0142418 A1 | 5/2015 | Byron et al. |
| 2015/0261744 A1 | 9/2015 | Suenbuel et al. |
| 2016/0300139 A1 | 10/2016 | Bhat et al. |
| 2017/0011026 A1 | 1/2017 | Byron et al. |
| 2017/0161261 A1 | 6/2017 | Mungi et al. |
| 2018/0203924 A1 | 7/2018 | Agrawal et al. |

OTHER PUBLICATIONS

Tanwar, et al., "An Effective Reasoning Algorithm for Question Answering System," IJACSA) International Journal of Advanced Computer Science and Applications, Special Issue on Natural Language Processing 2014, 6 pages.

Khot, et al., "Markov Logic Networks for Natural Language Question Answering," arXiv:1507.03045v1 [cs.AI] Jul. 10, 2015, 7 pages.

Pundge, et al., "Question Answering System, Approaches and Techniques: A Review," International Journal of Computer Applications (0975-8887), vol. 141—No. 3, May 2016, 6 pages.

Khashabi, et al., "Question Answering via Integer Programming over Semi-Structured Knowledge," ArXiv:1604.06076v1 [cs.AI] Apr. 20, 2016, 12 pages.

Non-Final Office Action received for U.S. Appl. No. 15/875,051 dated Oct. 9, 2019, 30 pages.

Final Office Action received for U.S. Appl. No. 15/875,051 dated Apr. 9, 2020, 37 pages.

List of IBM Patents or Patent Applications Treated as Related.

CN Office Action for CN Application No. 201910045919.5 dated Dec. 2, 2022.

FACILITATING ANSWERING QUESTIONS INVOLVING REASONING OVER QUANTITATIVE INFORMATION

BACKGROUND

The subject disclosure relates to facilitating answering questions involving reasoning over quantitative information, and more specifically, facilitating answering questions that involve mathematical computations.

SUMMARY

The following presents a summary to provide a basic understanding of one or more embodiments of the invention. This summary is not intended to identify key or critical elements, or delineate any scope of the embodiments or any scope of the claims. Its sole purpose is to present concepts in a simplified form as a prelude to the more detailed description that is presented later. In one or more embodiments herein, devices, systems, computer-implemented methods, apparatus and/or computer program products that facilitate answering questions that involve mathematical computations.

According to one embodiment, a system is provided. The system can comprise a memory that stores computer executable components. The system can also comprise a processor, operably coupled to the memory, and that can execute computer executable components stored in the memory. The computer executable components can comprise an analysis component that transforms a natural language query into a first logical representation and extrinsic knowledge into a second logical representation relevant to the natural language query. The computer executable components can further comprise a merging component that merges the first logical representation and the second logical representation into a third logical representation. The computer executable components can further comprise an answering component that generates answers for the natural language query based on processing of the third logical representation.

According to another embodiment, a computer-implemented method is provided. The computer-implemented method can comprise transforming, by a system operatively coupled to a processor, a natural language query into a first logical representation and extrinsic knowledge into a second logical representation relevant to the natural language query. The computer-implemented method can further comprise merging, by the system, the first logical representation and the second logical representation into a third logical representation. The computer-implemented method can further comprise generating, by the system, answers for the natural language query based on processing of the third logical representation.

According to another computer program product facilitating answering questions that involve mathematical computations is provided. The computer program product can comprise a computer readable storage medium having program instructions embodied therewith. The program instructions can be executable by a processor to cause the processor to transform a natural language query into a first logical representation and extrinsic knowledge into a second logical representation relevant to the natural language query. The program instructions can further be executable by a processor to cause the processor to merge the first logical representation and the second logical representation into a third logical representation. The program instructions can further be executable by a processor to cause the processor to generate answers for the natural language query based on processing of the third logical representation.

DETAILED DESCRIPTION

Figure 1:
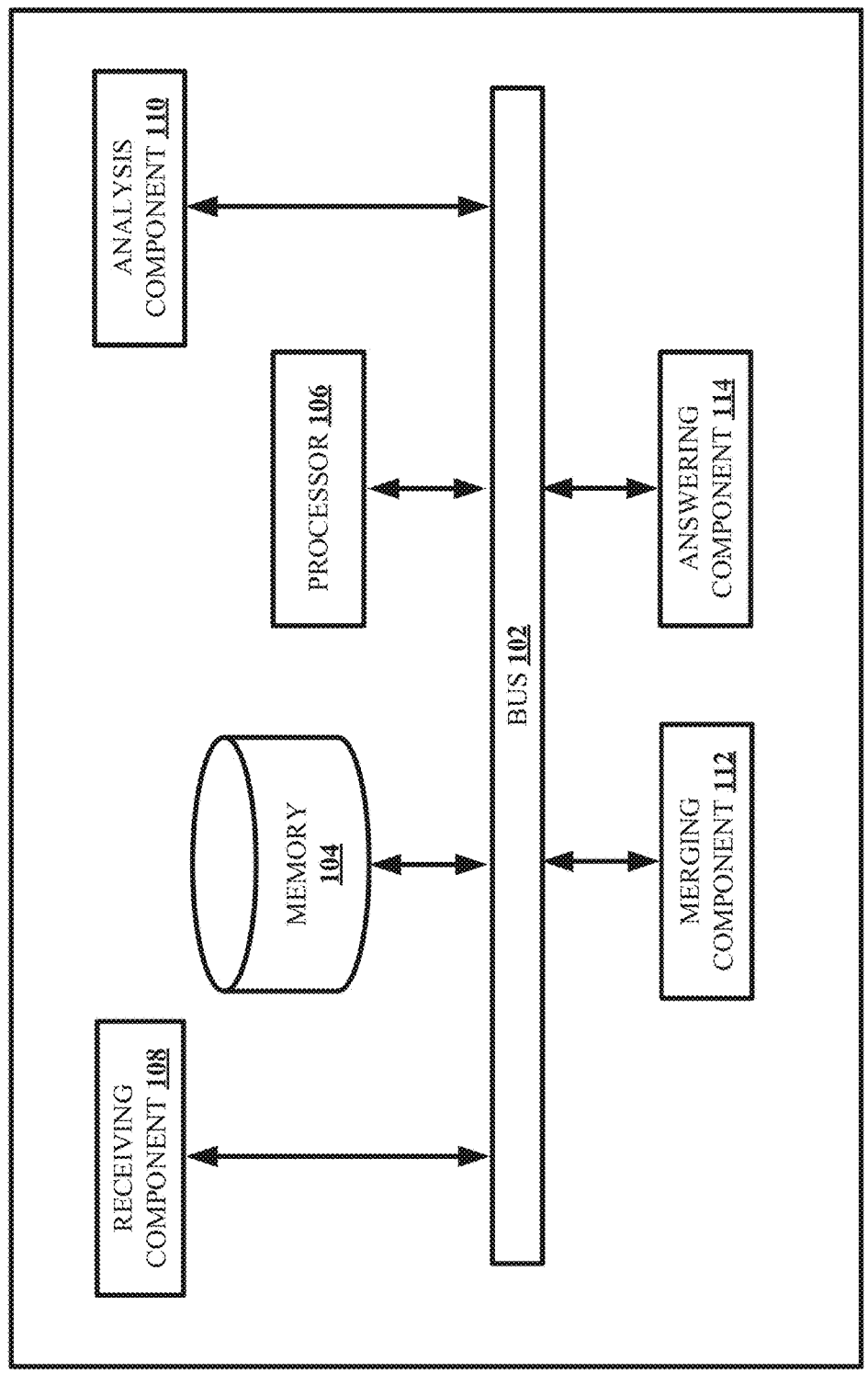
FIG. 1 illustrates a block diagram of an example, non-limiting system facilitating answering questions that involve mathematical computations in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

One or more embodiments described herein can generate answers for natural language queries that involve mathematical computations. Modern cognitive agents typically handle or answer users' questions involving the manipulation of quantitative information. More specifically, when interacting with an automated insurance agent, for example, the user may ask questions that involve mathematical calculations. For example, a user may ask: "What is the monthly payment for a $2,000 premium with 2.9% annual percentage rate (APR) over nine months and $300 down payment?" To fully provide an accurate answer, one or more of the embodiments herein can take as input extrinsic data or extrinsic knowledge not provided in the question or query. The extrinsic data can be data that can influence the monthly payment. Similarly, when interacting with a cognitive logistics agent, the user may provide information asking questions regarding the status of the current inventory costs. For example, a user may ask: "What is the cost of inventory at the end of year two given $400,000 merchandise purchases, $10,000 freight-in costs, $5,000 freight-out costs and $2,000 purchase returns?" The extrinsic data can be that the freight-out cost is not part of the calculation for the cost of inventory.

The one or more embodiments described herein can be applicable to domains such as human resources, insurance, real estate, banking, finance, etc. The embodiments herein can handle complex computations described in natural language to assist humans in their day-to-day operations. More specifically, the embodiments herein can adapt new rules (e.g., extrinsic data or extrinsic knowledge) in the respective domains for various computations (e.g., budget, mortgage repayments, etc.) by automatically compiling them into logical formulas. The embodiments herein are not restricted to algebra only questions. The questions do not have to contain all the knowledge to provide an answer. The answer can be derived from information contained in both the question as well as the background knowledge about the domain. In addition, the probabilistic logic or constraint framework can account for the inherent uncertainty when automatically processing natural language and can therefore provide probabilistic answers. For example, the one or more embodiments herein can provide a probabilistic framework that can provide answers with a confidence value by employing training models.

FIG. 1 illustrates a block diagram of an example, non-limiting system 100 that can facilitate answering questions that involve mathematical computations in accordance with one or more embodiments described herein. Aspects of systems (e.g., system 100 and the like), apparatuses or processes explained in this disclosure can constitute one or more machine-executable components embodied within one or more machines, e.g., embodied in one or more computer readable mediums (or media) associated with one or more machines. Such components, when executed by the one or more machines, e.g., computers, computing devices, virtual machines, etc., can cause the machines to perform the operations described.

In various embodiments, the system 100 can be any type of component, machine, device, facility, apparatus, and/or instrument that comprises a processor. In some embodiments, system 100 is capable of effective and/or operative communication with a wired and/or wireless network. Components, machines, apparatuses, devices, facilities, and/or instrumentalities that can comprise the system 100 can include, but are not limited to, tablet computing devices, handheld devices, server class computing machines and/or databases, laptop computers, notebook computers, desktop computers, cell phones, smart phones, consumer appliances and/or instrumentation, industrial and/or commercial devices, digital assistants, multimedia Internet enabled phones, multimedia players, and the like.

As illustrated in FIG. 1, the system 100 can comprise bus 102, memory 104, processor 106, receiving component 108, analysis component 110, merging component 112 and/or answering component 114. The bus 102 can provide for interconnection of various components of the system 100.

The memory 104 and processor 106 can carry out computation and/or storage operations of the system 100 as described herein. It is to be appreciated that in some embodiments one or more system components can communicate wirelessly with other components, through a direct wired connection or integrated on a chipset.

In one or more embodiments described herein of system 100, predictive analytics can be used to automatically generate models used by the system 100 to facilitate automatically providing answers with higher confidence values. For example, the automatic generation can be based on information retained in a knowledgebase. As used herein, the term "knowledgebase" can be a database or other storage location or repository that can store one or more types of information. All such embodiments are envisaged.

The knowledgebase can comprise information related to the first order logic and constraints of the extrinsic knowledge and natural language query. In some embodiments, the information related to the first order logic and constraints of the extrinsic knowledge and natural language query can be gathered over time and retained in the knowledgebase. In some embodiments, the information gathered can include a set of equations that can be employed to calculate a natural language query (e.g., a question phrased in natural language). Based on the obtained information, the system 100 can evaluate the knowledgebase (or multiple knowledgebases) and generate equations for natural language queries based information known about other natural language queries. The predictive analytics of system 100 can determine that, if information of a natural language query is similar to one or more other natural language queries, the models of the similar natural language queries can be utilized to facilitate automatically answering questions that involve mathematical computations.

The computer processing systems, computer-implemented methods, apparatus and/or computer program products described herein can employ hardware and/or software to generate models that are highly technical in nature, that are not abstract and that cannot be performed as a set of mental acts by a human. For example, the one or more embodiments can perform the lengthy and complex interpretation and analysis on a copious amount of available information to generate models and determine which models should be utilized for a natural language query. In another example, the one or more embodiments can perform predictive analytics on a large amount of data to facilitate automatically answering questions that involve mathematical computations with a high level of accuracy, even in the absence of detailed knowledge about the natural language query. Accuracy can be evaluated by comparing a training set with a test set. After training a model employing a training set, accuracy can be calculated using a test set by computing percentage of output generated by the model running on the training set elements that matches a predicted target.

The receiving component 108 can receive a natural language query comprising mathematical attributes and extrinsic knowledge relevant to the natural language query. The natural language query can be a question in natural text and/or utterances. For example, a person's voice can be employed with a user interface to communicate questions to a chatbot. As used herein, the term "natural text," "natural language," "text" and "utterance" can be used interchangeably. The natural language query can also include, but is not limited to, tables, graphs and charts. As such, the natural language query can come from multiple sources. For example, the natural language query can be narrated by a person and can also include tables and graphs.

The extrinsic knowledge can be background knowledge pertaining to a number of domains such as human resources, insurance, real estate, banking, finance, etc. The extrinsic knowledge can be in natural text from documents, diagrams, tables, graphs, charts, etc. Additionally, the extrinsic knowledge is not limited to print data and can also come from other sources such as the web, user feedback, etc. As used herein, the term "extrinsic knowledge," "background knowledge" and "domain knowledge" can be used interchangeably. The extrinsic knowledge can contain additional information that can affect the true answer of the natural language query. For example, the extrinsic knowledge can be a set of rules or a set of equations used to compute the answer for the natural language query. The extrinsic knowledge can be updated as additional data are made available.

In various embodiments, the analysis component 110 can transform a natural language query into a first logical representation and extrinsic knowledge into a second logical representation relevant to the natural language query. The first logical representation and the second logical representation can contain a set of equations that can be used to compute the answer for the natural language query. The first logical representation can include a first order logic, constraints and constants extracted from the natural language query. The constraints can capture various relations between the variables in the documents. The constraint can be between two variables such as x=y, between 3 variables such as $x \neq y \neq z$ or $x+y<z$, etc. The constants can be numbers, dates, names, etc., that are relevant to the question. The constants in the texts can be identified using an entity recognition engine, which seeks to locate the entities in the text into defined categories such as numbers, dates, names, etc.

The second logical representation can include a first order logic and constraints extracted from the extrinsic knowledge. The extrinsic knowledge can be in natural text and can come from the web, diagrams, tables, graphs, charts, etc. The extrinsic knowledge can also come from the user feedback. In addition, the extrinsic knowledge can be knowledge of user context. For example, a global positioning system can collect data that the user is at a car dealership so the user's question regarding interest rates may be related to cars rather than homes. In another example, if a user has been browsing online for cars, the user's question regarding interest rates again may be related to cars rather than homes. The analysis component 110 can compile extrinsic knowledge from one or more sources relevant to the natural language query into a first order logic and constraints.

The analysis component 110 can transform natural text into a formal representation such as a probabilistic logic and a constraint programming. The analysis component 110 can employ and train a sequence to sequence model based on Long Short Term Memory (LSTM) neural networks (e.g., a text to logical form conversion with deep neural networks (DNNs)) to transform the natural text into a first order logic based formal representation. Although the probabilistic logic can be a generic first order logic based formal representation as used in examples herein, in practice the target language can be more specific to address computation issues. For example, the formal representation or probabilistic logic can also be Horn clauses (prolog), probabilistic Horn clauses (problog), lambda calculus, Markov logic, etc.

For example, the input received via the receiving component 108 can be a collection of text documents D (e.g., D={D1, . . . , Dm}). The text documents (e.g., natural text) can be a natural language query or extrinsic knowledge. The analysis component 110 can transform the natural language query and the extrinsic knowledge into a formal (e.g., logical) representation of the knowledge embedded in the text as a set of logical clauses L (e.g., L={L1, . . . , Ln}). Let L={ }. For a document Di in {D1, . . . , Dm}, let Lk be the logical representation of sentence Sj in document Di. The logical representation Lk of sentence Sj can be obtained by using an LSTM-based sequence to sequence model which was previously trained for the desired first order logic language. Also, for a document Di in {D1, . . . , Dm}, assign (e.g., via the probabilistic component 302) a probability p to Lk reflecting how well Lk represents sentence Sj (e.g., based on distributional semantics or energy values E(Lk, Sj) if using deep neural network (DNN) based conversion of Sj to Lk). The set of logical clauses L can equal to L U {Lk}. The analysis component 110 can also run a theorem prover to ensure L is consistent and return L. Here, U denotes the set union operator, which can combine the result sets of two or more select statements.

The analysis component 110 can transform the natural text into a set of constraint programming. The constraint programming based formal representation with the generic constraint programming can also be more specific. For example, the constraint programming can be numeric constraint satisfaction problem (CSP) which deals with continuous domains, probabilistic (concurrent) CSP, etc.

For example, the input received via the receiving component 108 can be a collection of text documents D (e.g., D={D1, . . . , Dm}). The text documents (e.g., natural text) can be a natural language query or extrinsic knowledge. The analysis component 110 can employ the constraint programming to output a set of constraints C (e.g., C={C1, . . . , Cn}) embedded in the text. Let C={ }. For a document Di in {D1, . . . , Dm}, let Ck be the constraint extracted from sentence Sj in document Di by running a DNN-based sequence to sequence model trained to recognize constraints such as x=y, $x \neq y \neq z$, $x+y<z$, etc. The set of constraints C can equal to C U {Ck}. Thus, the analysis component 110 can return the set of constraints C. Here, U denotes the set union operator, which can combine the result sets of two or more select statements.

Furthermore, the analysis component 110 can also generate constants CONST embedded in the natural text. For example, the input received via the receiving component 108 can be a question Q in text format (e.g., natural text or utterances). The analysis component 110 can output constants CONST embedded in the question text or natural language query. The constants CONST can be a set of constants (e.g., numbers, dates, names, etc.) in the question text or natural language query. The constant CONST can be identified using an entity recognition engine, which seeks to locate and classify the entities in the question text into defined categories such as numbers, dates, names, etc. The analysis component 110 can let LQ be the logical representation of question Q and let CQ be the constraints extracted from question Q and return LQ, CQ and CONST.

The merging component 112 can merge the first logical representation (e.g., from the natural language query) and the second logical representation (e.g., from the extrinsic knowledge) into a third logical representation. The merging component 112 can merge the first and second logical representation by grounding the constants of the probabilistic logic and constraint programming within the first and second logical representation. That is, the merging component 112 can merge the formal representation of the natural language query and the extrinsic knowledge into a third logical representation. The first logical representation and the second logical representation can contain a set of rules or equations. The third logical representation can be the logic program or constraint program, which can be a set of equations combined from the first logical representation and the second logical representation by grounding the constants.

The third logical representation can be a formal representation of the background knowledge (e.g., extrinsic knowledge) and of the question (e.g., natural language query) and the constants (e.g., from the natural language query). The third logical representation can be a single set of logic program or constraint program that have been merged from the first logical representation and the second logical representation wherein the constants are grounded. The constants in the logical clauses from the natural language query (e.g., the first logical representation) and the extrinsic knowledge (e.g., the second logical representation) can be grounded by the merging component 112 to obtain a grounded logical representation or logic program. The constants in the constraints from the natural language query and the extrinsic knowledge can be grounded by the merging component 112 to obtain a grounded constraint program. The logic program or constraint program can contain a set of rules or equations that can be employed by the answering component 114 to compute the answers.

Figure 7:
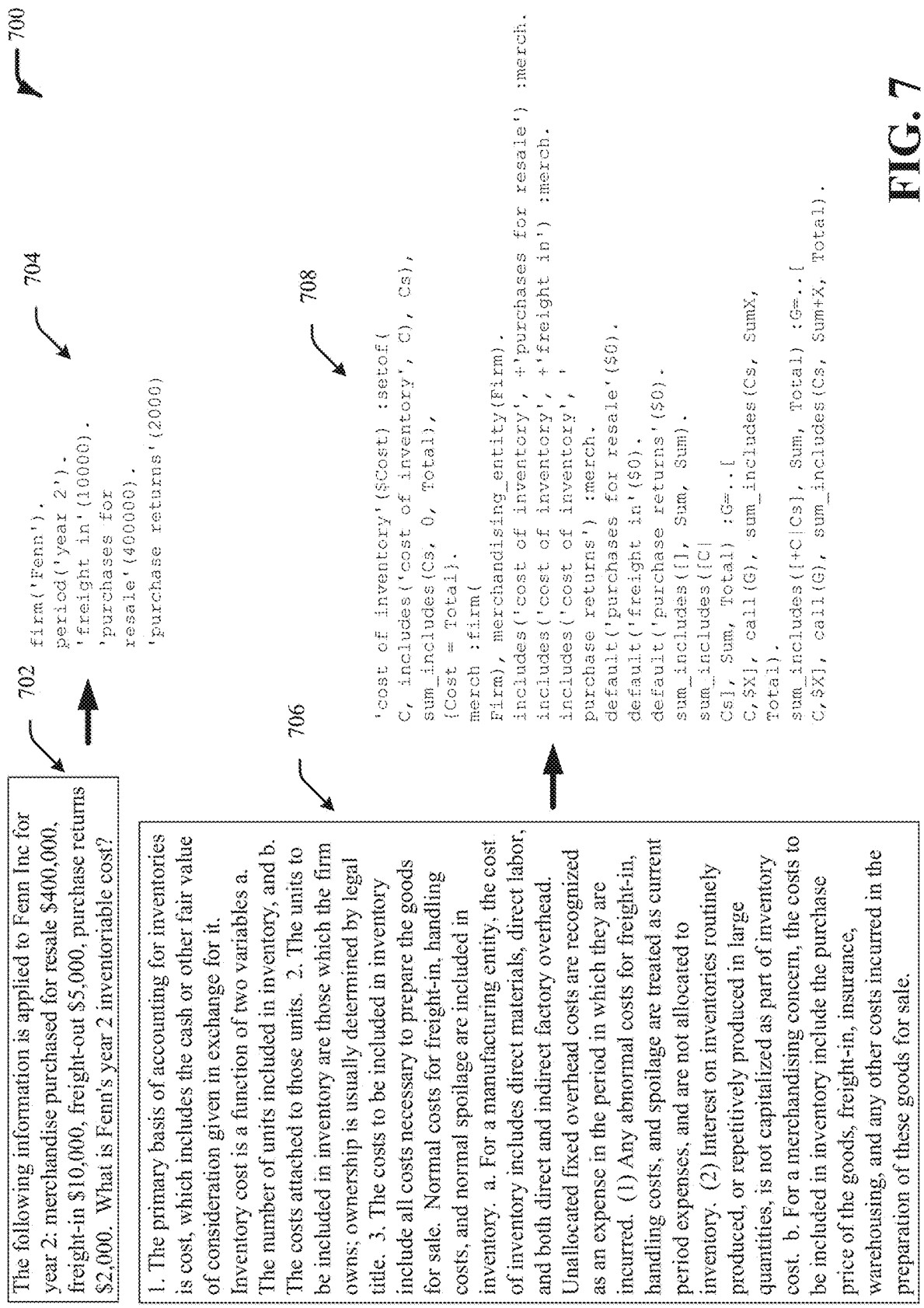
FIG. 7 illustrates example, non-limiting logic programs converted from natural texts in accordance with one more embodiments described herein.

The answering component 114 can generate answers for the natural language query based on processing (e.g., computation) of the third logical representation. The answering component 114 can compute the answers using the equations from the third logical representation. The latter (e.g., the third logical representation) is a valid logic program or a valid constraint program which can be solved by a specialized solver (e.g., employed by the answering component 114) to provide the answer to the original question. For example, FIG. 7 depicts a valid Prolog program (e.g., logic program) for a hypothetical question and the relevant extrinsic knowledge about inventory costs. The program can be solved by a Prolog solver (e.g., employed by the answering component 114) to compute the true value of the grounded predicate "cost inventory" which in turn can provide the answer to the inventory cost question. The answer can be a numerical answer. The answers can be narrated back to the user in natural language by employing a chatbot. In some instances, the answers can be additional questions. For example, the cost of inventory can include the freight-in cost, the purchase for resale amount and the purchase returns amount. If the natural language query does not provide either the freight-in cost, the purchase for resale amount and/or the purchase returns amount, the answer can be additional questions asking for the same.

More specifically, the answer to the question can be mapped to an answer variable denoted by X. Variable X can take on one or more values. In one possible embodiment, the answering component 114 can solve the grounded probabilistic logic program corresponding to the input question and relevant extrinsic knowledge and return the value x of X such as $P(X=x)$ is the highest, where $P(X=x)$ denotes the posterior marginal probability of variable X taking value x. The answering component 114 can also provide an explanation of the answer computed as the Maximum A Posteriori (MAP) Hypothesis configuration of the probabilistic logic program.

Figure 2:
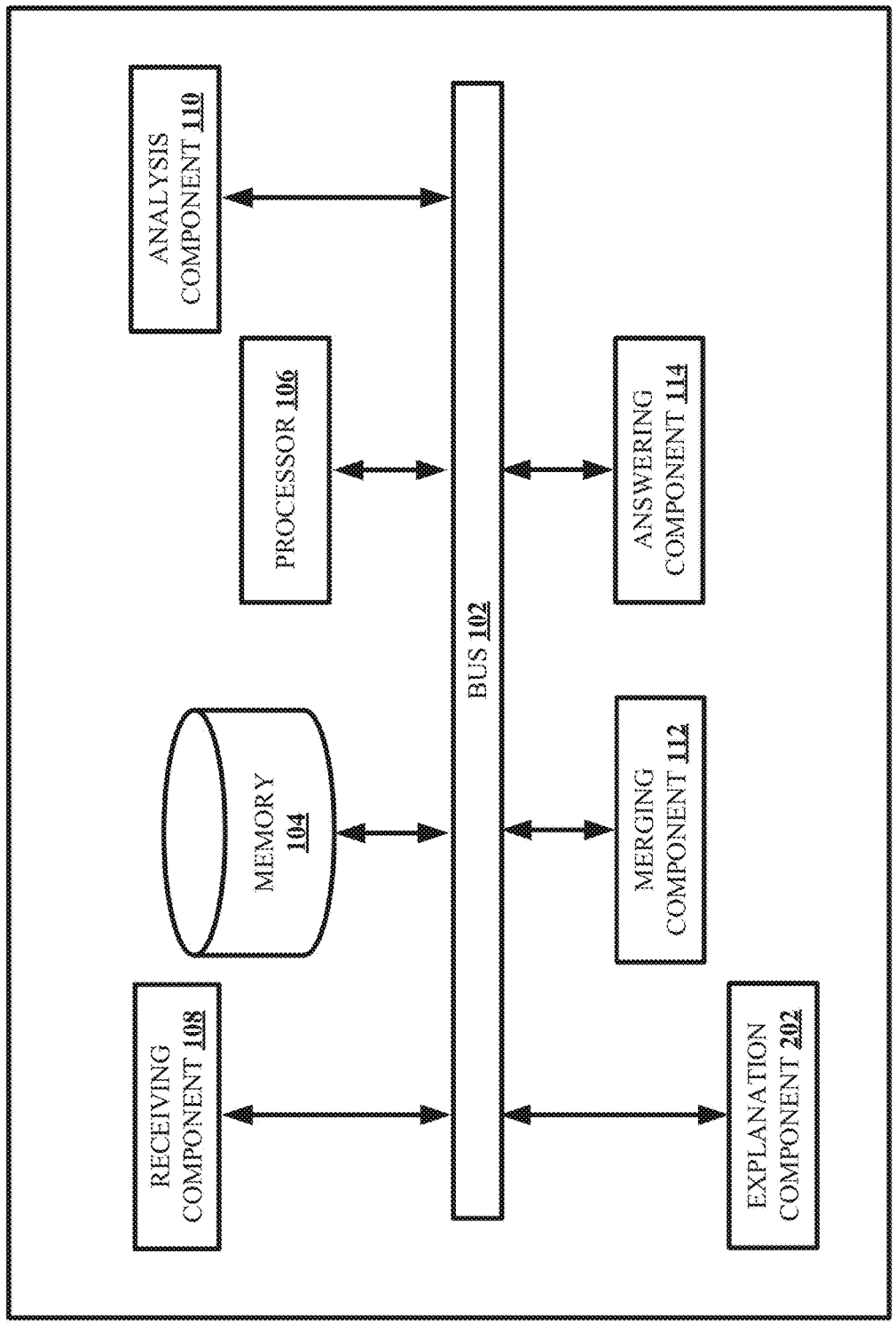
FIG. 2 illustrates a block diagram of an example, non-limiting system facilitating answering questions that involve mathematical computations including an explanation component in accordance with one or more embodiments described herein.

FIG. 2 illustrates a block diagram of an example, non-limiting system 200 facilitating answering questions that involve mathematical computations including explanation component 202 in accordance with one or more embodiments described herein. Repetitive description of like elements employed in other embodiments described herein is omitted for sake of brevity. The explanation component 202 can generate explanations for the answers. For example, for questions pertaining to the cost of inventory, the explanation can include a detailed account of how the cost of inventory was calculated. The explanation can also explain in detail why the freight-out amount was not included in the calculation. The source of the information can also be part of the explanation. For example, the explanation can state which sources the equations came from and the number of sources that provide the same set of equations. As a result, the explanation can also include the probability of the first logical representation, second logical representation and third logical representation being correct. In addition, the explanation can also include the probability of the answer being correct.

Figure 3:
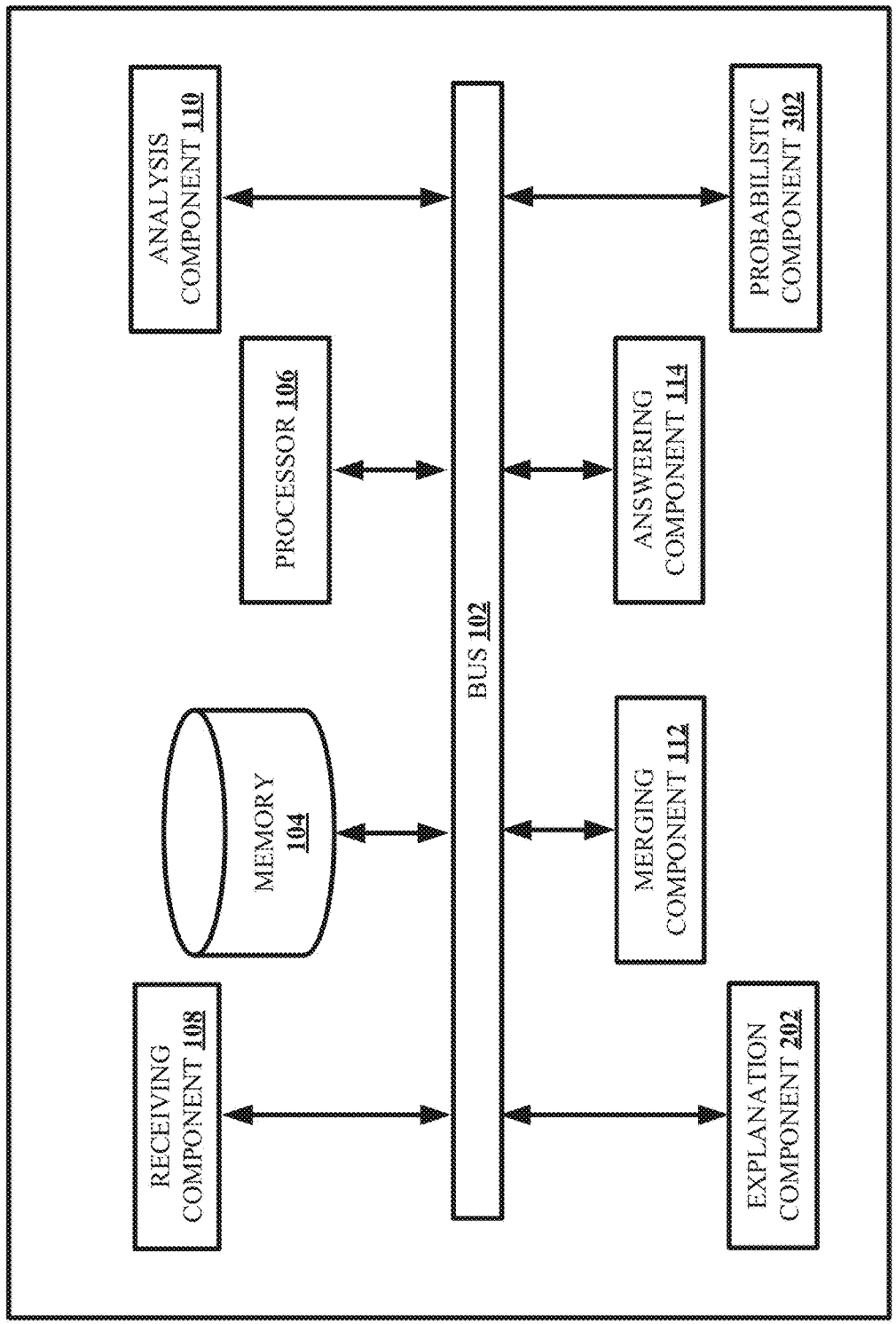
FIG. 3 illustrates a block diagram of an example, non-limiting system facilitating answering questions that involve mathematical computations including a probabilistic component in accordance with one or more embodiments described herein.

FIG. 3 illustrates a block diagram of an example, non-limiting system 300 facilitating answering questions that involve mathematical computations including probabilistic component 302 in accordance with one or more embodiments described herein. Repetitive description of like elements employed in other embodiments described herein is omitted for sake of brevity. The probabilistic component 302 can assign confidence values to the first logical representation, the second logical representation, the third logical representation and the answers. For example, for a document Di in {D1, . . . , Dm}, the probabilistic component 302 can assign a probability p to Lk (e.g., logical representation) reflecting how well Lk represents sentence Sj (e.g., based on distributional semantics or energy values E(Lk, Sj) if using deep neural network (DNN) based conversion of Sj to Lk).

The probabilistic component 302 can generate a probability of the answer being correct. In some embodiments, models can be employed and trained (e.g., with more data available and/or user feedback) which can reduce the inherent uncertainty during conversion and thus provide answers with higher confidence. For example, if there are numerous sources that provide the same set of equations the answer can have a higher confidence level than if there are only a few sources. It is appreciated that the embodiments herein can account for conflicting sources. For example, a source can exclude the freight-out cost in calculating the cost of inventory while another source can include the freight-out cost in the calculation. The probabilistic component 302 can also rank the answers and the corresponding explanations that are most probable based on the confidence values for the answers. The confidence values can be a numerical value of the weight associated with the logical representations. For example, the logical representations can be a set of equations that have weight values or confidence values based on the number of sources that provide the same. Additionally, if a set of equations have been used previously with favorable user feedback, the confidence values can also be higher as well.

Figure 4:
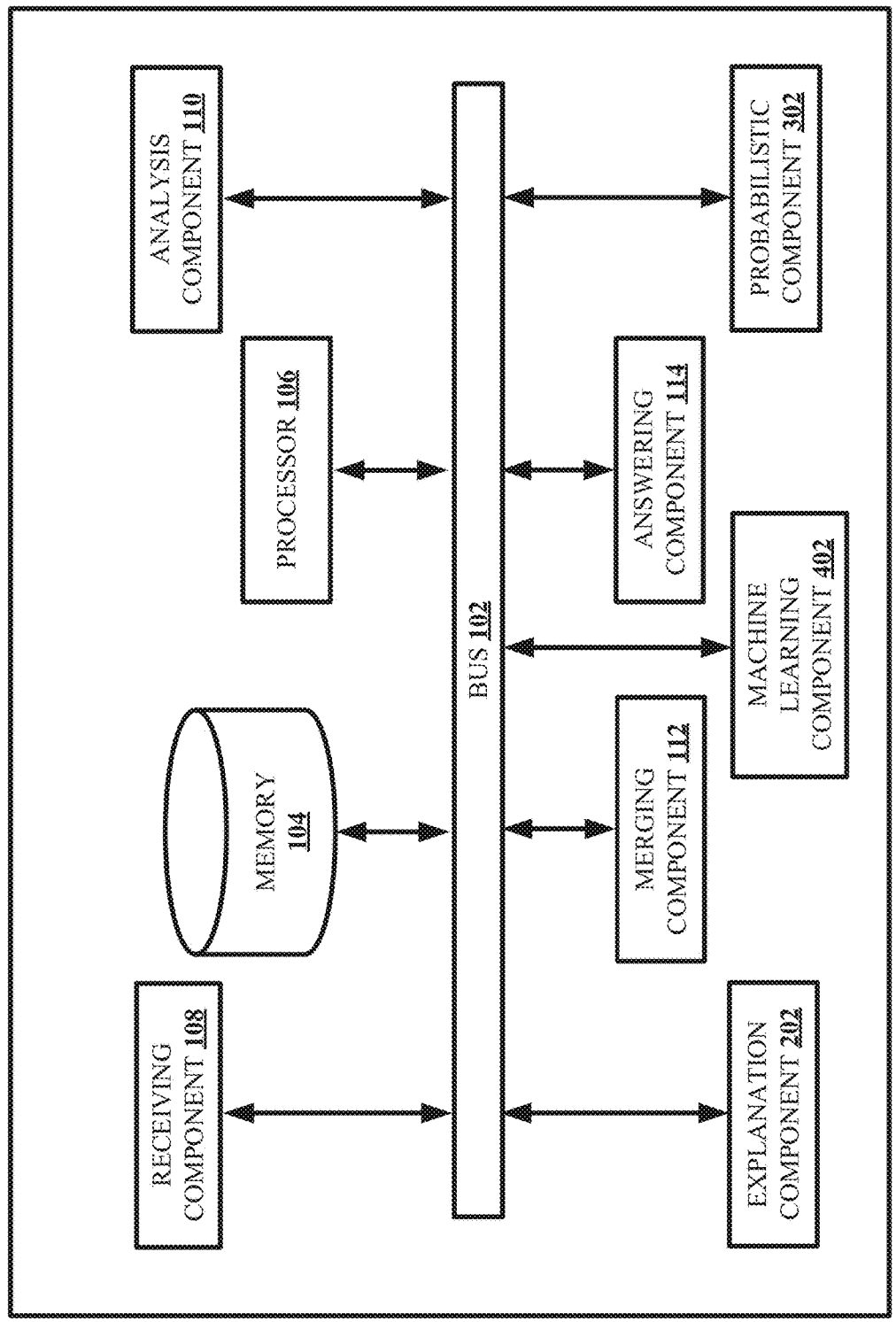
FIG. 4 illustrates a block diagram of an example, non-limiting system facilitating answering questions that involve mathematical computations including a machine learning component in accordance with one or more embodiments described herein.

FIG. 4 illustrates a block diagram of an example, non-limiting system 400 facilitating answering questions that involve mathematical computations including machine learning component 402 in accordance with one or more embodiments described herein. Repetitive description of like elements employed in other embodiments described herein is omitted for sake of brevity. The machine learning component 402 can generate and train models with the answers and the explanations based on user feedback to provide answers with higher confidence values. In some embodiments, the machine learning component 402 can train models with additional data that becomes available and with user feedback to reduce the inherent uncertainty during conversion and thus provide answers with higher confidence.

The analysis component 110 can transform the natural language query and the extrinsic knowledge into the first and second logical representations, which can contain a set of rules or equations. The merging component 112 can merge the first and second logical representation into a third logical represent that can contain a logic program or constraint program, which can contain a set of rules or equations. The set of rules or equations can be used by the answering component 114 to compute the answers. The data generate through the process and the user feedback can be retained to train the models. For example, the question can be the cost of inventory and the calculation is a set of equations that excludes the freight-out cost. Based on the computation using the natural language query and the extrinsic knowledge along with the user feedback with favorable outcome, the models can be trained to provide answers with higher confidence for other similar types of questions.

The embodiments of devices described herein can employ artificial intelligence (AI) to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect) described herein, components described herein can examine the entirety or a subset of the data to which it is granted access and can provide for reasoning about or determine states of the system, environment, etc. from a set of observations as captured via events and/or data. Determinations can be employed to identify a specific context or action, and/or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether or not the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
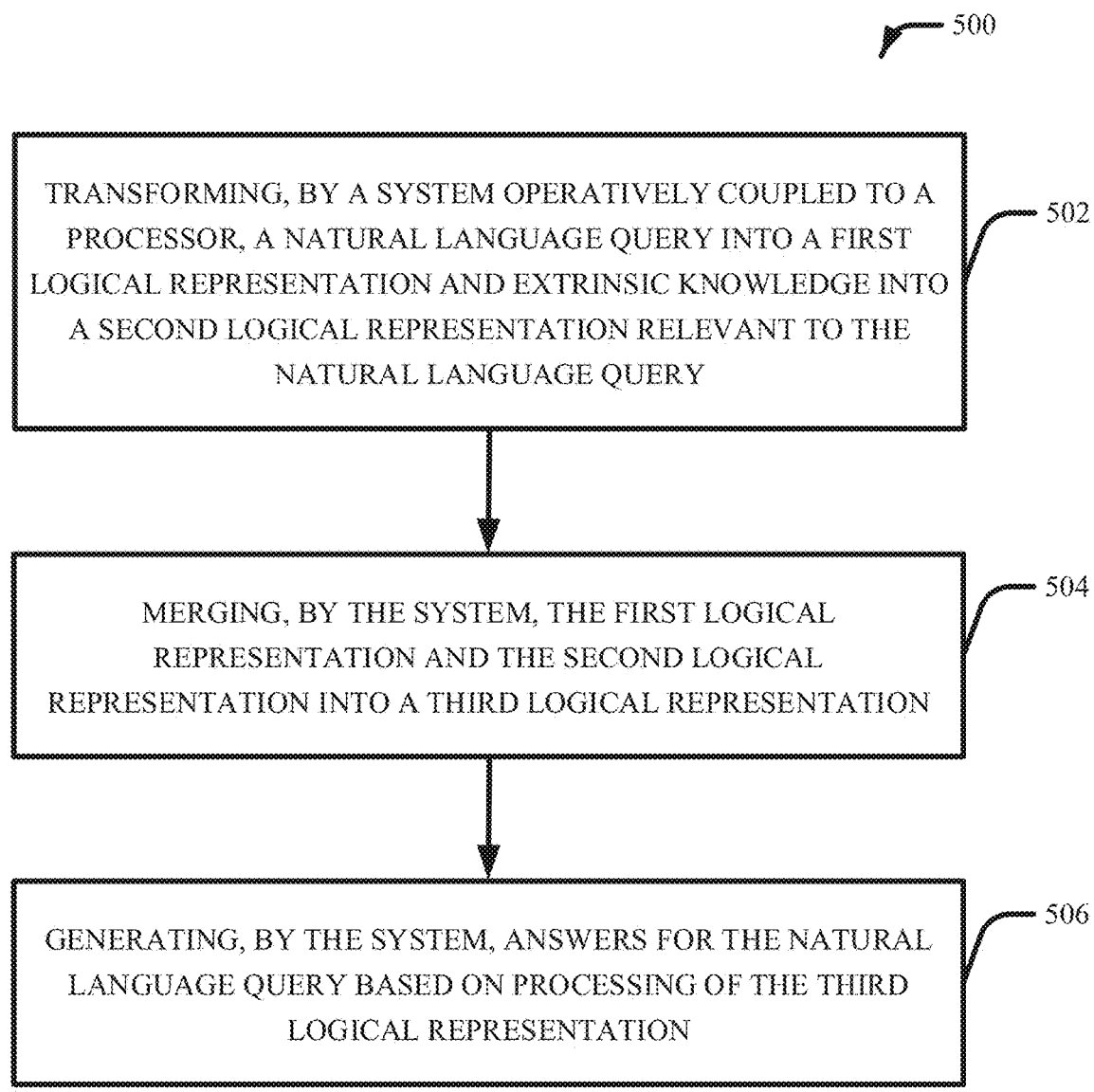
FIG. 5 illustrates an example, non-limiting computer-implemented method facilitating answering questions that involve mathematical computations in accordance with one or more embodiments described herein.

FIG. 5 illustrates an example, non-limiting computer-implemented method 500 facilitating answering questions that involve mathematical computations in accordance with one or more embodiments described herein. Repetitive description of like elements employed in other embodiments described herein is omitted for sake of brevity. At 502, the computer-implemented method 500 can comprise transforming (e.g., via the analysis component 110), by a system operatively coupled to a processor, a natural language query into a first logical representation and extrinsic knowledge into a second logical representation relevant to the natural language query. At 504, the computer-implemented method 500 can comprise merging (e.g., via the merging component 112), by the system, the first logical representation and the second logical representation into a third logical representation. At 506, the computer-implemented method 500 can comprise generating (e.g., via the answering component 114), by the system, answers for the natural language query based on processing of the third logical representation.

Figure 6:
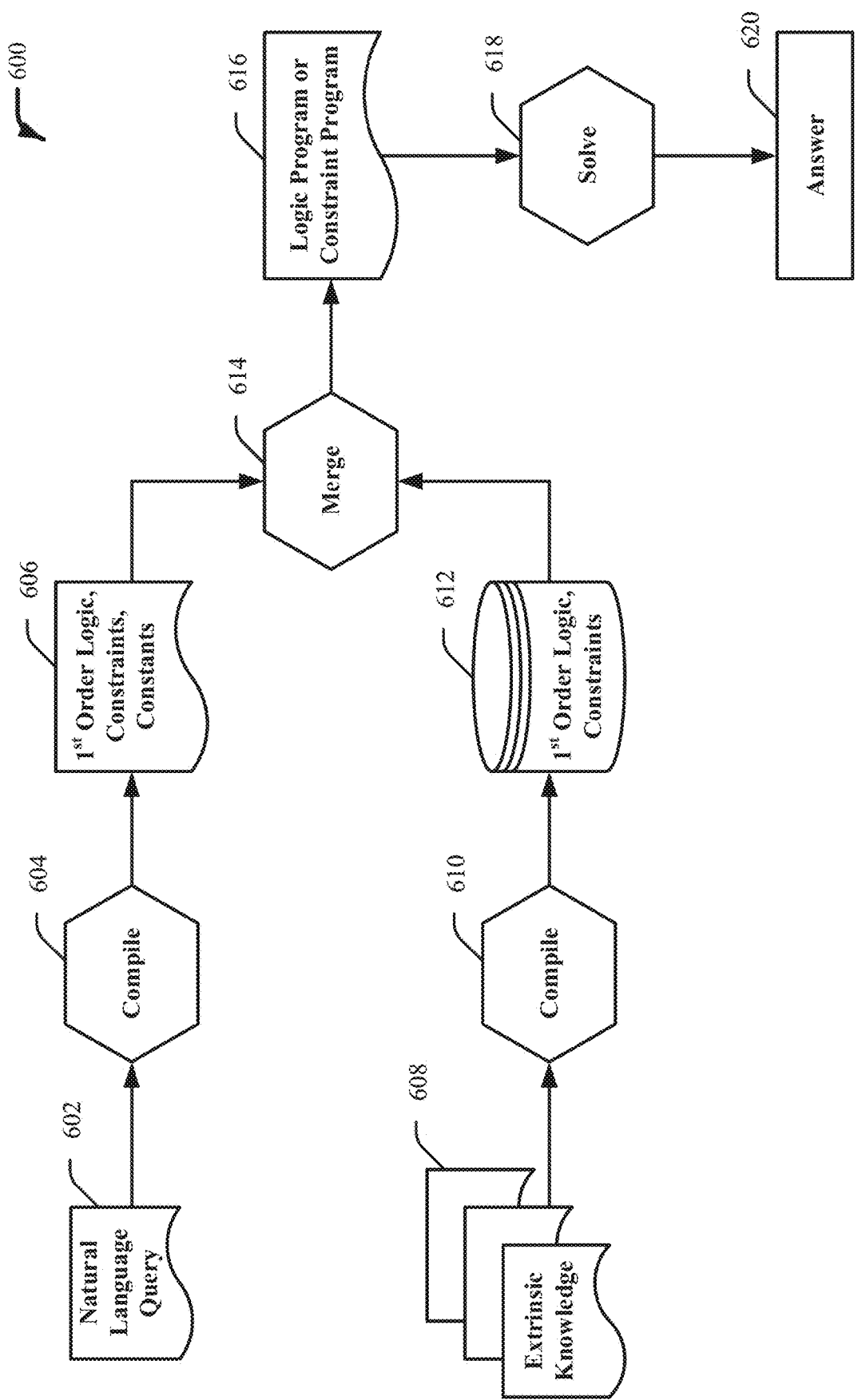
FIG. 6 illustrates a block diagram of an example, non-limiting system facilitating answering questions that involve mathematical computations in accordance with one or more embodiments described herein.

FIG. 6 illustrates a block diagram of an example, non-limiting system 600 facilitating answering questions that involve mathematical computations in accordance with one or more embodiments described herein. Repetitive description of like elements employed in other embodiments described herein is omitted for sake of brevity. The receiving component 108 can receive as input the natural language query 602. The natural language query can be natural text, tables, graphs, charts, etc. The analysis component 110 (e.g., compiler 604) can compile the data in the natural language query 602 to generate the first logical representation 606. The first logical representation 606 can be a set of logical clauses LQ (e.g., a first order logic), constraints CQ and constants CONST embedded in the text.

The receiving component 108 can also receive as input the extrinsic knowledge 608. The extrinsic knowledge 608 can be natural text, information from the web, diagrams, tables, graphs, charts, etc. The analysis component 110 (e.g., compiler 610) can compile the data from the extrinsic knowledge 608 to generate a second logical representation 612. The second logical representation 612 can be a set of logical clauses (e.g., first order logic) L and a set of constraints C embedded in the text.

The merging component 112 (e.g., merger 614) can merge the first logical representation 606 and the second logical representation 612 into the third logical representation 616. The third logical representation 616 can be a logic program or constraint program. The merging component 112 can ground the constants from the first logical represent 606 and the second logical representation 612 to form the logic program or constraint program in the third logical representation 616. More specifically, the merging component 112 can ground all the constants in the logical clauses from the extrinsic knowledge and the natural language query to obtain a grounded logical representation or logic program. Additionally, the merging component 112 can ground all the constants in the constraints from the extrinsic knowledge and the natural language query to obtain a grounded constraint program.

The answering component 114 (e.g., solver 618) can employ the third logical representation 616 to solve the answer 620. The third logical representation 616 can include a set of rules or equations that the answering component 114 can employ to compute the answer 620. The answer 620 can be a numerical answer and can also be narrated in natural language or natural text. The answer can also include an explanation as to how the answer was computed. For example, if the answer is the cost of inventory, the explanation can provide detailed information as to why the freight-out cost is not included in calculating the answer.

FIG. 7 illustrates example, non-limiting logic programs 700 converted from natural texts in accordance with one or more embodiments described herein. Repetitive description of like elements employed in other embodiments described herein is omitted for sake of brevity. The question or natural language query 702 can be received by the receiving component 108 in natural text. The analysis component 110 can employ an LSTM based sequence to sequence model (e.g., a text to logical form conversion with DNNs) to convert the text in the natural language query 702 into the first logical representation 704, a first order logical formula. The first logical representation 704 includes constants such as the firm's name (e.g., Fenn) and the time period (e.g., year 2). The first logical representation 704 also includes a list of costs relevant for computing the answer such as the freight-in cost (e.g., 10000), purchases for resale (e.g., 40000) and purchase returns (e.g., 2000).

The domain knowledge or extrinsic knowledge 706 can also be received by the receiving component 108 in natural text. The analysis component 110 can also employ an LSTM based sequence to sequence model (e.g., a text to logical form conversion with DNNs) to convert the text in the extrinsic knowledge 706 into the second logical representation 708, also a first order logical formula. The second logical representation 708 can include a list of costs and rules or equations for computing the answer to the natural language query 702. The list of costs that is included in the equations in second logical representation 708 includes 'purchases for resale', 'freight in' and 'purchase returns'. The text in the extrinsic knowledge 706 does not include the freight-out amount in calculating the cost of inventory.

The natural language query 702 can be inputted into an LSTM based sequence to sequence model, which can output the first logical representation 704. Similarly, an LSTM based sequence to sequence model can take as input the extrinsic knowledge 706 and output the second logical representation 708. The LSTM based sequence to sequence model can be trained with standard methods (e.g., the gradient method) using a collection of training examples such as question texts, utterances, logical formulas, etc. For example, the input or utterance (e.g., text) can be, "What is three plus 6?" In this example, the output or logical formula can be, "(query sum 3 6)." In another example, the input or utterance (e.g., text) can be: "How much is the monthly payments for a 9 month premium of $1200.00 and a $200.00 down payment?" In this example, the output or logical formula can be: "(query (amount monthly_payment:e) (equals (period (months 9:i)) (list (equals (amount premium: e) (dollar 1200.00:i)) (equals (amount intial_payment:e) (dollar 200.00:i)))."

Figure 8:
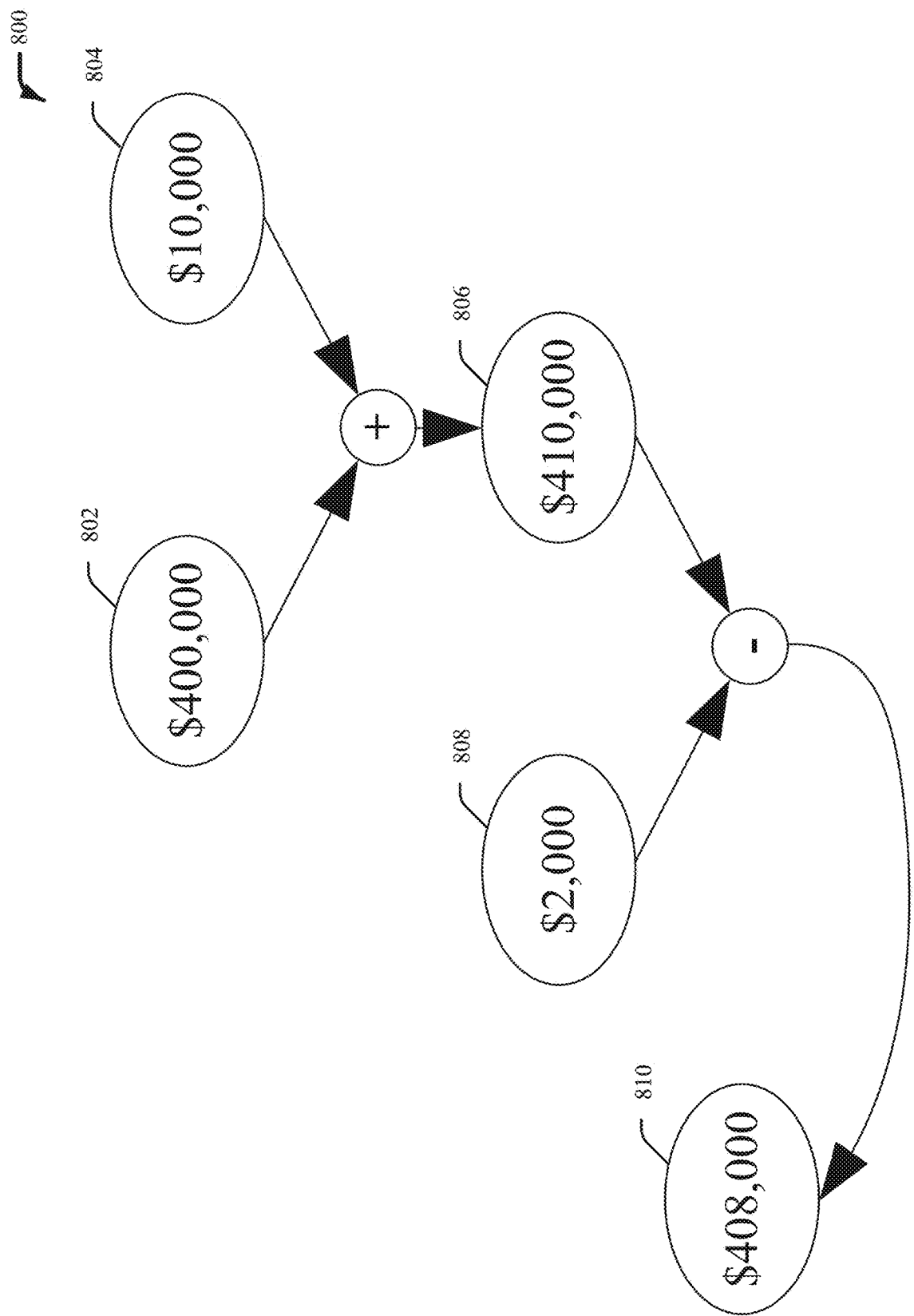
FIG. 8 illustrates an example, non-limiting computation in accordance with one or more embodiments described herein.

FIG. 8 illustrates an example, non-limiting computation 800 in accordance with one or more embodiments described herein. Repetitive description of like elements employed in other embodiments described herein is omitted for sake of brevity. The computation 800 is based on the natural language query 702, which asks, "The following information is applied to Fenn Inc for year 2: merchandise purchased for resale $400,000, freight-in $10,000, freight-out $5,000, purchase returns $2,000. What is Fenn's year 2 inventoriable cost?"

The computation 800 can include adding (e.g., via the answering component 114) the purchase for resale amount 802 (e.g., $400,000) with the freight-in cost 804 (e.g., $10,000) to receive the sum 806 (e.g., $410,000). The purchase returns amount 808 (e.g., $2,000) is subtracted (e.g., via the answering component 114) from the sum 806 (e.g., $410,000) to receive the answer 810 (e.g., $408,000). Although the freight-out amount of $5,000 is included in the natural language query 702, the freight-out amount does not apply in computing the answer 810. Based on the information obtained from the extrinsic knowledge 706 and compiled into the second logical representation 708, the freight-out amount is not part of the equation.

The answer that the cost of inventory is $408,000 can be narrated in natural text or natural language back to the user using a chatbot. The answer can also include an explanation. For example, the answer can include how the cost of inventory was calculated and/or why the freight-out amount was not included in the calculation. In addition, the answer can also include the probability of the answer being correct. The models can be trained with the data and the user feedback to provide answers with higher confidence. For example, after employing a set of equations for similar types of questions and receiving (e.g., via the receiving component 108) feedback of favorable outcome, the analysis component 110 can generate the first, second and third logical representations that can include equations with higher confidence. Likewise, the answering component 114 can also compute the answer with higher confidence.

Figure 9:
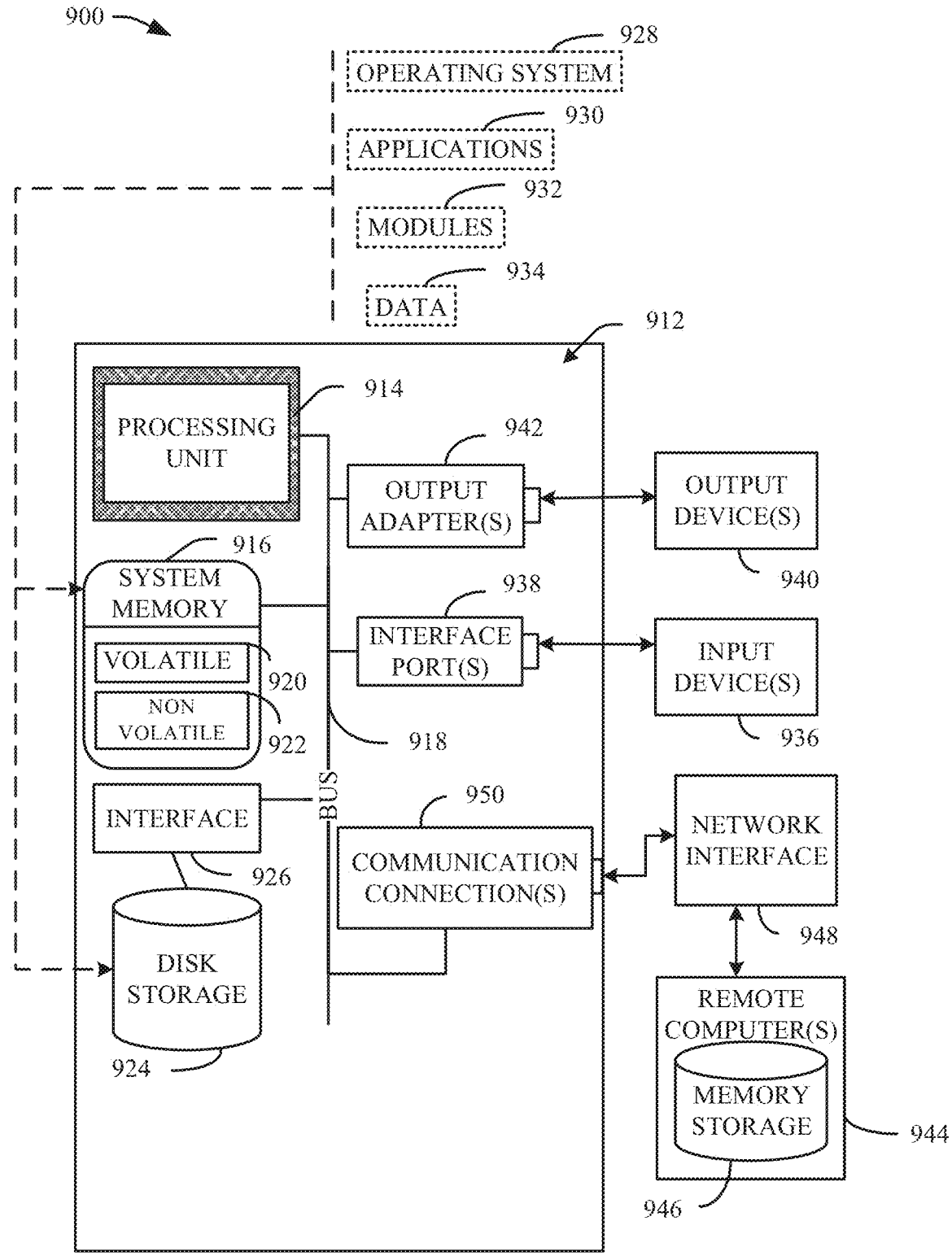
FIG. 9 illustrates a block diagram of an example, non-limiting operating environment in which one or more embodiments described herein can be facilitated.

To provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 916 can also include volatile memory 920 and nonvolatile memory 922. The basic input/output system (BIOS), containing the basic routines to transfer information between elements within the computer 912, such as during start-up, is stored in nonvolatile memory 922. Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media. To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which involve special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc., that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components;
    a processor, operably coupled to the memory, and that executes the computer executable components stored in the memory, wherein the computer executable components comprise:
        a merging component that:
            transforms a natural language query into a first logical representation in a standardized format, wherein at least part of the natural language query is not in the standardized format;
            transforms extrinsic knowledge associated with a domain into a second logical representation in the standardized format, wherein at least part of the extrinsic knowledge is not in the standardized format; and
            generates a third logical representation by combining the first logical representation of the natural language query and the second logical representation of the extrinsic knowledge, wherein the natural language query involves one or more mathematical computations;
        an answering component that generates answers for the natural language query based on processing of the third logical representation; and
        a probabilistic component that assigns respective confidence values to the answers, wherein a confidence value for an answer is based on a quantity of sources in the domain that have a same set of equations for determining the answer.

2. The system of claim 1, wherein the confidence value indicates a higher confidence as the quantity of sources that have the same set of equations for determining the answer increases.

3. The system of claim 1, wherein the probabilistic component ranks the answers based on the respective confidence values for the answers.

4. The system of claim 1, further comprising an explanation component that generates respective explanations for the answers.

5. The system of claim 4, further comprising a machine learning component that trains a model with the answers and the respective explanations based on user feedback.

6. The system of claim 1, wherein the answers comprise at least one question.

7. The system of claim 1, wherein the extrinsic knowledge is based on a user context associated with the natural language query.

8. A computer-implemented method, comprising:
   transforming, by a system operatively coupled to a processor, a natural language query into a first logical representation in a standardized format, wherein at least part of the natural language query is not in the standardized format;
   transforming, by the system, extrinsic knowledge associated with a domain into a second logical representation in the standardized format, wherein at least part of the extrinsic knowledge is not in the standardized format;
   generating, by the system, a third logical representation by combining the first logical representation of the natural language query and the second logical representation of the extrinsic knowledge, wherein the natural language query involves one or more mathematical computations;
   generating, by the system, answers for the natural language query based on processing of the third logical representation; and
   assigning respective confidence values to the answers, wherein a confidence value for an answer is based on a quantity of sources in the domain that have a same set of equations for determining the answer.

9. The computer-implemented method of claim 8, wherein the confidence value indicates a higher confidence as the quantity of sources that have the same set of equations for determining the answer increases.

10. The computer-implemented method of claim 8, further comprising ranking the answers based on the respective confidence values for the answers.

11. The computer-implemented method of claim 8, further comprising generating respective explanations for the answers.

12. The computer-implemented method of claim 11, further comprising training a model with the answers and the respective explanations based on user feedback.

13. The computer-implemented method of claim 8, wherein the answers comprise at least one question.

14. The computer-implemented method of claim 8, wherein the extrinsic knowledge is based on a user context associated with the natural language query.

15. A computer program product for facilitating answering questions that involve mathematical computations, the computer program product comprising a computer readable storage medium having program instructions embodied therewith, the program instructions executable by a processor to cause the processor to:
   transform a natural language query into a first logical representation in a standardized format, wherein at least part of the natural language query is not in the standardized format;
   transform extrinsic knowledge associated with a domain into a second logical representation in the standardized format, wherein at least part of the extrinsic knowledge is not in the standardized format;
   generate a third logical representation by combining the first logical representation of the natural language query and the second logical representation of the extrinsic knowledge, wherein the natural language query involves one or more mathematical computations;
   generate answers for the natural language query based on processing of the third logical representation; and
   assign respective confidence values to the answers, wherein a confidence value for an answer is based on a quantity of sources in the domain that have a same set of equations for determining the answer.

16. The computer program product of claim 15, wherein the confidence value indicates a higher confidence as the quantity of sources that have the same set of equations for determining the answer increases.

17. The computer program product of claim 15, wherein the program instructions are further executable to cause the processor to:
   rank the answers based on the respective confidence values for the answers.

18. The computer program product of claim 15, wherein the program instructions are further executable to cause the processor to:
   generate respective explanations for the answers.

19. The computer program product of claim 18, wherein the program instructions are further executable to cause the processor to:
   train a model with the answers and the respective explanations based on user feedback.

20. The computer program product of claim 15, wherein the answers comprise at least one question.

* * * * *